Oct. 19, 1971   R. A. SCHICKLING   3,613,315
AUTOMATIC MAIL OPENER
Filed Nov. 13, 1969   7 Sheets-Sheet 1

FIG. 1.

INVENTOR
ROBERT A. SCHICKLING
BY
John F. A. Earley
ATTORNEY

Oct. 19, 1971  R. A. SCHICKLING  3,613,315
AUTOMATIC MAIL OPENER

Filed Nov. 13, 1969  7 Sheets-Sheet 4

INVENTOR
ROBERT A. SCHICKLING
BY
John F. A. Earley
ATTORNEY

INVENTOR
ROBERT A. SCHICKLING
BY
John F. A. Earley
ATTORNEY

Oct. 19, 1971 — R. A. SCHICKLING — 3,613,315
AUTOMATIC MAIL OPENER
Filed Nov. 13, 1969 — 7 Sheets-Sheet 6

INVENTOR
ROBERT A. SCHICKLING
BY
*John F. A. Earley*
ATTORNEY

Oct. 19, 1971   R. A. SCHICKLING   3,613,315
AUTOMATIC MAIL OPENER

Filed Nov. 13, 1969   7 Sheets-Sheet 7

INVENTOR
ROBERT A. SCHICKLING
BY
John F. A. Earley
ATTORNEY 3,613,315
AUTOMATIC MAIL OPENER
Robert A. Schickling, B & S Machine Co., 1915 E.
Willard St., Philadelphia, Pa. 19134
Filed Nov. 13, 1969, Ser. No. 876,524
Int. Cl. B24b 7/20
U.S. Cl. 51—74 R                    16 Claims

ABSTRACT OF THE DISCLOSURE

A machine for opening the envelopes in a stack comprises a plurality of arms arranged to pick up envelopes individually from the stack. Each envelope is moved by an arm in a path so that it passes three abrading wheels. One of its edges is opened by the first abrading wheel. The envelope is then rotated 90° by the arm, and a second edge is opened by the second abrading wheel. The arm then rotates the envelope a further 90° so that a third edge is opened by the third abrading wheel. The arm then deposits the opened envelopes in a stack.

BACKGROUND OF THE INVENTION

Various letter opening machines are known in the prior art. Some involve the cutting of edges of envelopes by co-operating knife-edged wheels. Others have abrading wheels or belts arranged to open corresponding edges of a plurality of envelopes in a stack simultaneously when the stack is held by hand in position adjacent the abrading surface.

Mail openers in the prior art have been unable to handle reliably the large volumes of envelopes such as are received by banks. Heretofore, in order to open more than one edge of an envelope, it has been necessary for an operator to perform some manual operation, e.g. reinserting the envelope into the machine in a different direction.

SUMMARY OF THE INVENTION

In accordance with this invention, completely automatic opening of three edges of an envelope is achieved by the provision of a plurality of arms supported and moved in a closed path by a sprocket-driven chain. The arms pick up envelopes individually from a stack, carrying the envelopes past three abrading wheels arranged on a common shaft. As the arms pass from one abrading wheel to the next, they are indexed 90° to expose a different edge of the envelope being carried to the next abrading wheel in the sequence. After an arm passes the last abrading wheel, it drops the opened envelope into a stack, and moves to the original position to pick up a new envelope to be opened.

It is an object of the invention to provide a mail opening machine which is fully automatic in that the only necessary manual operations are the insertion of a stack of envelopes into a loading bin and the removal of opened envelopes from an outgoing bin.

Further objects are to open multiple edges of envelopes without the necessity for intervening manual steps, to provide reliable operation, and to insure against damage to the contents of the envelopes.

A further object of the invention is to provide a mail opening machine which automatically accommodates a wide variety of sizes of envelopes.

DESCRIPTION OF THE PREFERRED EMBODIMENT

Figure 1:
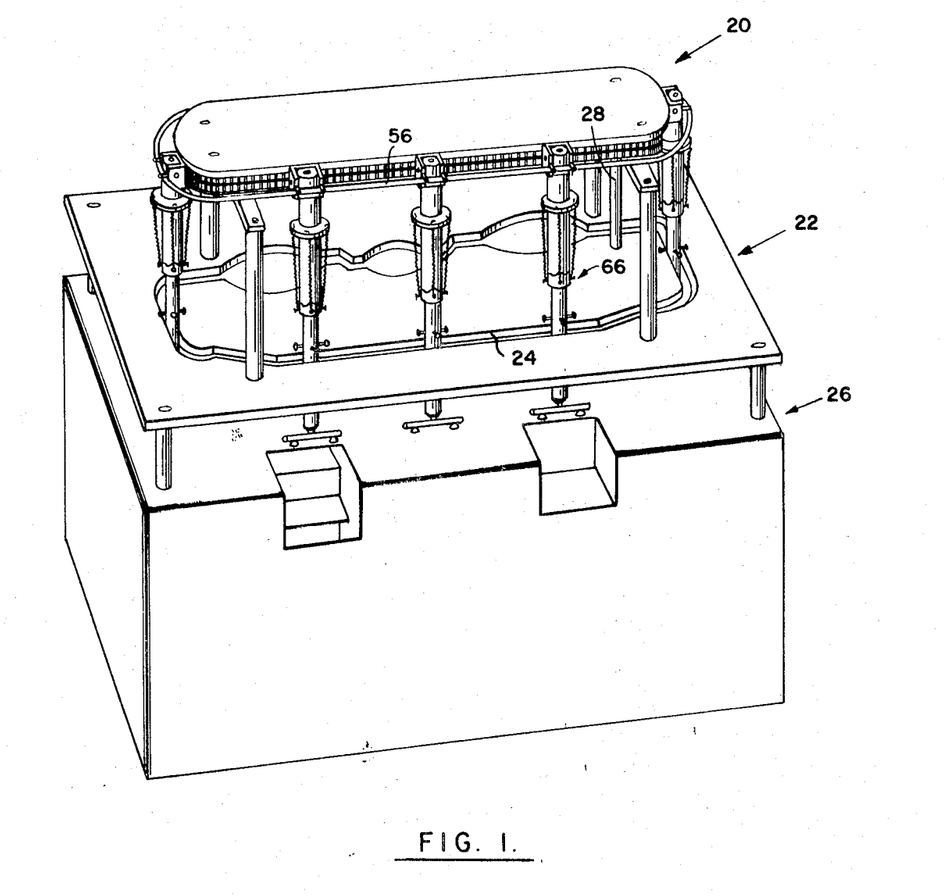
FIG. 1 is a perspective of the envelope carrying and opening mechanism showing the relationship between the various major parts.

As best seen in FIG. 1, the apparatus comprises three main decks: the upper deck 20 containing the mechanism for driving the pick-up arms in an approximately rectangular closed path; a second deck 22 providing a guide slot 24 for restricting swinging movement of the pick-up arms; and a third deck 26 supporting the abrading mechanism.

Figure 2A:
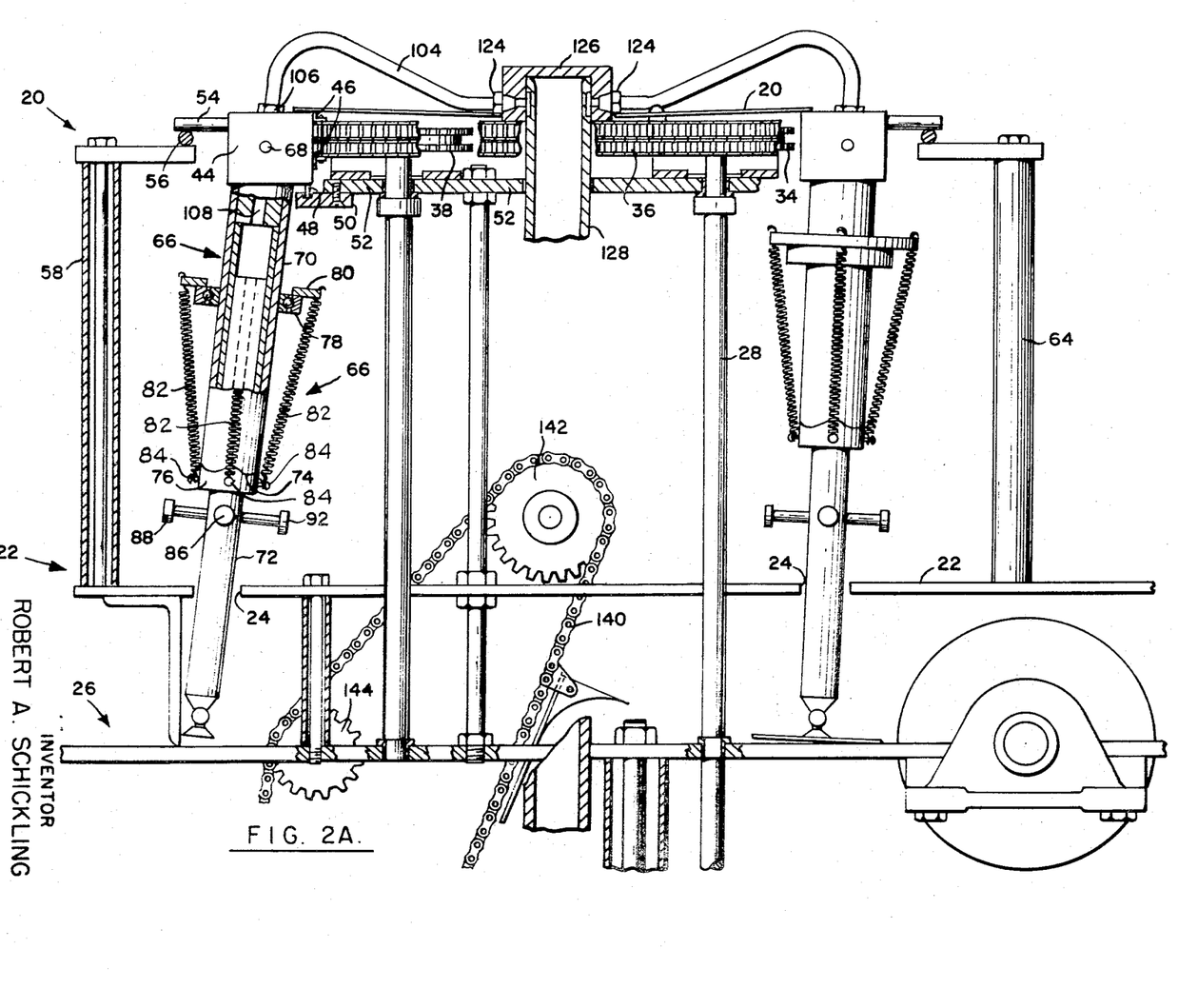
FIGS. 2A and 2B constitute an elevation of the mail opening machine viewed from the right-hand side of FIG. 1.
Figure 2B:
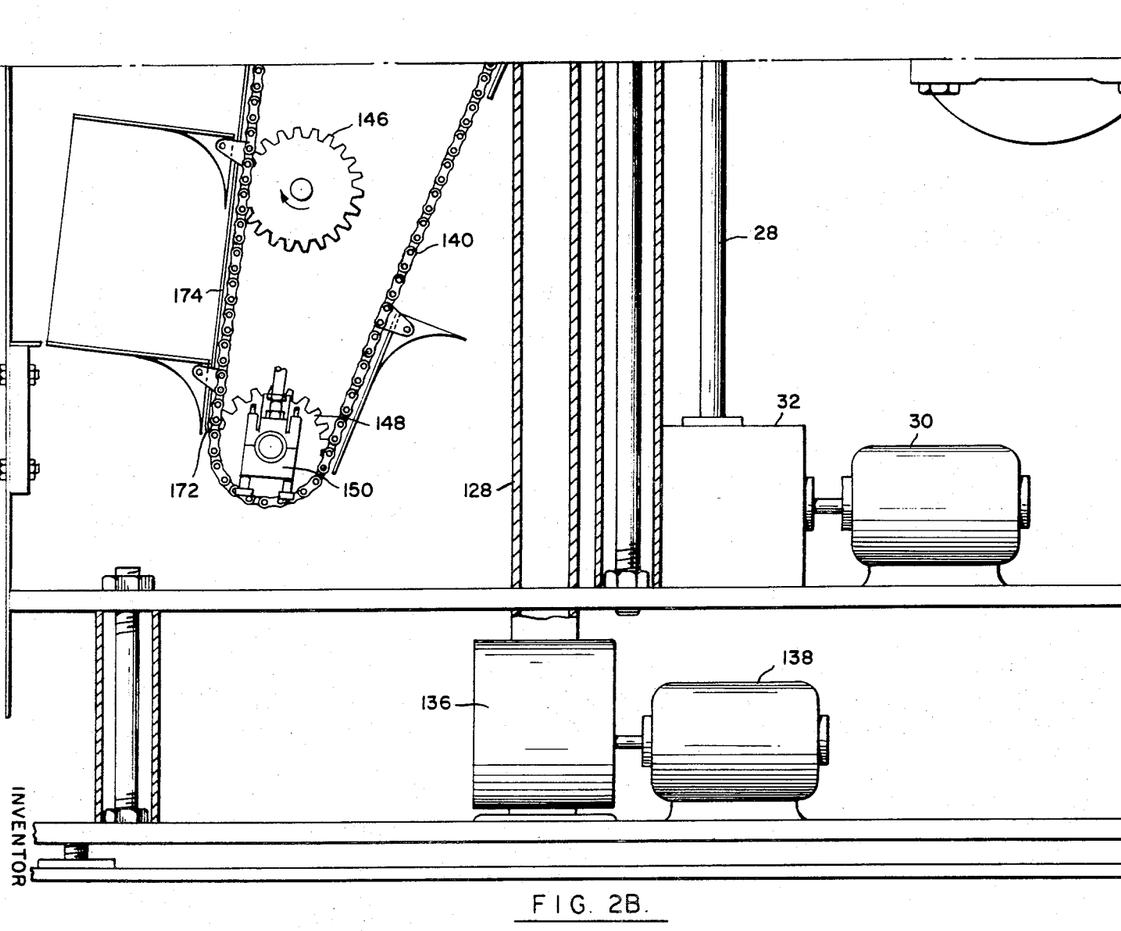
Figure 3:
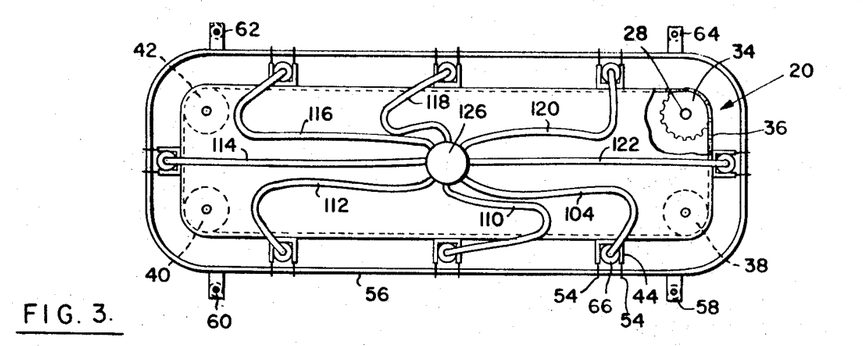
FIG. 3 is a top plan of the mail opening machine showing the cover plate and a track for supporting the eight envelope-carrying arms.

Referring to FIGS. 2A and 2B, vertical shaft 28 is rotated by motor 30 through a right-angled reduction gear box 32. Shaft 28 drives a sprocket 34, the position of which is shown in FIG. 3. A double roller chain 36 passes around driven sprocket 34 and around idler sprockets 38, 40 and 42.

The double roller chain moves eight pick-up arms in a closed, approximately rectangular path. The pick-up arms are fastened to a chain at uniformly spaced positions. In FIG. 2A, there is shown a block 44, having a U-shaped horizontal cross section as shown in FIG. 3. Block 44 is directly fastened to chain 36 by brackets 46. It is provided with downwardly extending pins 48 which ride in a track 50 fastened to the underside of bearing plate 52 and extending around the machine. Additionally, pins 54 extend horizontally outwardly from block 44 and ride on a track 56 which is supported at the outside of the chain path by supports 58–64.

Arm 66 is pivoted in block 44 on pins 68 so that it can swing in order to follow guide slot 24. As will become apparent from the description to follow, the horizontal distance between the guide slot and the drive chain 36 varies as the arms travel along the guide slot.

Figure 10:
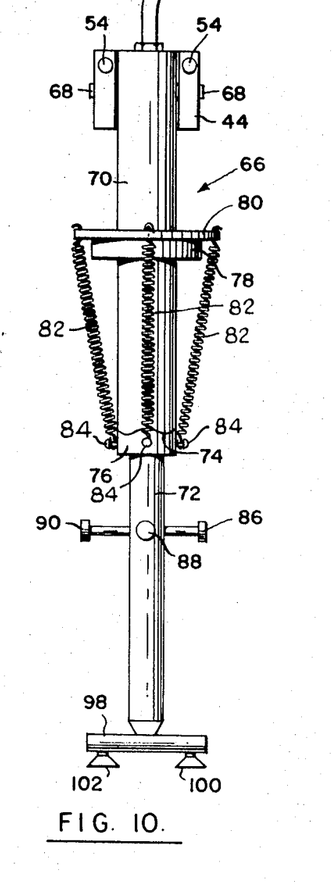
FIG. 10 is a side elevation of an envelope-carrying arm as seen from the right-hand side of FIG. 6.
Figure 14:
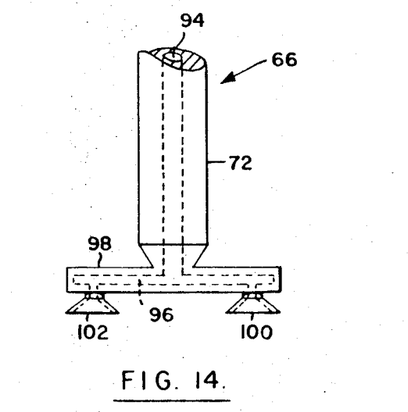
FIG. 14 is a fragmentary view of an envelope-carrying arm showing its internal passages in broken lines.

FIGS. 2A, 10 and 14 show the construction of pickup arm 66. The arm comprises a cylinder 70 which is pivoted in block 44 on pins 68, and a plunger 72 which extends into the cylinder. The lower end of cylinder 70 is in the form of a knuckle joint 74, cooperating with a mating knuckle joint 76 mounted on the plunger. The inner race of a ball bearing assembly 78 is fixed to cylinder 70 and the outer race supports a plate 80 for free rotation with respect to the cylinder. Springs 82 are connected between plate 80 and pins 84 on joint 76 to urge the knuckle joints into engagement with each other. Each of the cooperating knuckle joints has four uniformly spaced projections so that the plunger 72 and cylinder 70 have four stable relationships spaced from each other at intervals of 90°.

The plunger 72 is provided with four radially extending indexing pins 86, 88, 90 and 92.

As shown in FIG. 14, the plunger 72 has a vertical central passage 94 which is in communication with a horizontal passage 96 in a horizontal tubular member 98 fixed to the lower extremity of plunger 72. Rubber suction cups 100 and 102 are provided at both ends of tubular member 98. The interiors of the suction cups are in communication with passage 96.

Returning to FIG. 2A, there is shown a flexible tube 104 connected to a fitting 106 at the upper end of cylinder 70. The flexible tube 104 communicates through fitting 106 with an internal passage 108 within cylinder 70. All of the eight pick-up arms and their mountings on the drive chain 36 are identical.

Figure 11:
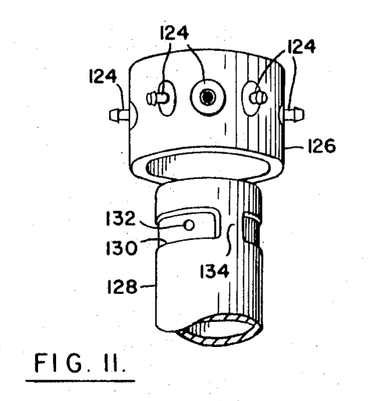
FIG. 11 is an exploded view showing a vacuum pipe and a manifold which normally fits over the vacuum pipe and rotates relative thereto.

Flexible line 104 and the corresponding lines connected to the other seven pick-up arm cylinders (shown in FIG. 3 at 110–122) are connected to fittings 124 of rotating manifold 126 shown in FIGS. 2A, 3 and 11. When manifold 126 is fitted over the upper end of vertical vacuum pipe 128, the openings of fittings 124 are in vertical alignment with slot 130. Slot 130 extends almost all the way around the upper end of vacuum pipe 128, and communicates with the interior of the vacuum pipe through a number of openings, one of which is shown at 132. A portion 134 between the ends of slot 130 is flush with the surface of pipe 128 and is provided for the purpose of cutting off the vacuum momentarily in order to deposit opened envelopes in a chute. The driving force tending to rotate manifold 126 is derived through the flexible lines.

Pipe 128, as shown in FIGS. 2A and 2B is connected to a vacuum pump 136 driven by electric motor 138.

The elevator mechanism is illustrated in FIGS. 2A, 2B, 6, 7, 8 and 9. FIGS. 2A and 2B show the path of a roller chain 140 over a plurality of sprocket wheels 142, 144, 146 and 148. Sprocket wheel 142 is motor-driven. Idler sprocket 148 is mounted on a tensioning mechanism 150. A similar roller chain 152 (FIGS. 6 and 7) is arranged in parallel with roller chain 140, and is driven on sprocket wheels mounted on the same shafts as the sprocket wheels associated with chain 140.

On the chains there are mounted elevator platforms at spaced intervals, one such platform being indicated at 154 in FIGS. 6, 7, 8 and 9. The platform comprises a plate 156 mounted on a pair of brackets 158 and 160. The brackets are pivoted on pins 162 and 164 extending respectively through lugs 166 and 168.

Figure 6:
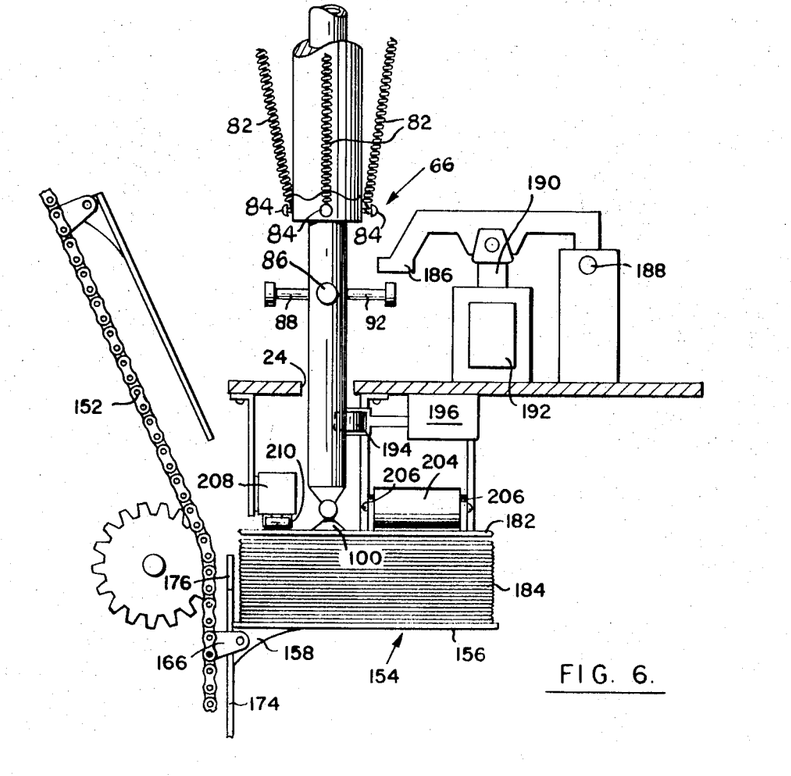
FIG. 6 is a vertical section taken on the plane 6—6 of FIG. 4, showing the mechanism for picking up envelopes from a stack, and also showing part of the envelope elevator.
Figure 7:
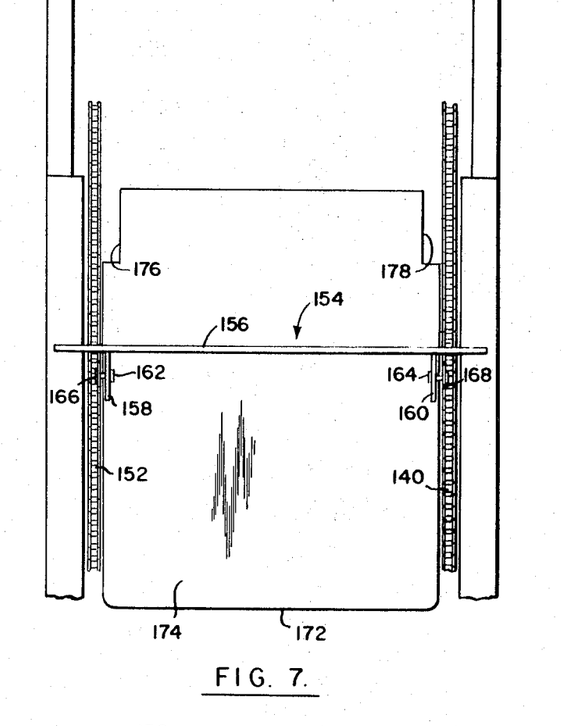
FIG. 7 is an elevation of the envelope elevator as seen from the right-hand side of FIG. 6.

A platform normally hangs downwardly from the chains since it is free to rotate about the pivoted pins. However, when the platform approaches the point at which envelopes are inserted into the machine, the rear edges 170 of the brackets engage the lower edge 172 (FIGS. 2B and 7) of a plate 174 which forms the rear wall of the envelope insertion opening. As it travels upwardly, the platform is maintained horizontal by the engagement of edges 170 of the brackets with the front surface of the plate 174 as shown in FIGS. 6 and 7. Near the upper end of plate 174, rectangular portions are cut out at 176 and 178 in the path of the platform brackets 158 and 160. These cut-out portions 176 and 178 permit the platform to fold downwardly when it approaches the upper end of the envelope insertion opening in order to clear the pick-up arm which extends downwardly into the envelope insertion opening as illustrated in FIG. 6.

In order to insure that an envelope is picked up by a pick-up arm each time it passes the pick-up point, the pick-up arm must be forced downwardly against the top envelope in the stack preferably with sufficient force to distort the suction cups.

In FIG. 6, arm 66 is shown in its position immediately following the picking up of the top envelope 182 of stack 184 resting on platform 154. A hammer 186 is pivoted at 188, and is connected to a pair of solenoid plungers, one of which is shown at 190 extending into solenoid 192.

A roller 194 of microswitch 196 is arranged below slot 24 so that it is engageable by arm 66. Microswitch 196 closes the circuit to the solenoid when hammer 186 is directly above horizontal pin 92. The hammer strikes pin 92 sharply, forcing the suction cups 100 and 102 against the top envelope 182. This insures that the vacuum being pulled through the suction cups attaches them to the envelope. It will be noted that the arm is moving laterally while the hammer is operating. Springs 82 urge the plunger of the arm upwardly as soon as pin 92 clears the head of the hammer, even though the hammer is maintained down by the solenoids.

A heavy roller 204 is mounted on pivoted arms 206 and rests against the stack of envelopes to prevent them from expanding.

The operation of the elevator motor is controlled by a microswitch 208 which has a roller 210 resting against the top envelope in the stack. The electrical circuitry is connected so that the elevator drive motor is operated only when roller 210 is allowed to move downwardly. The switch 208 is opened as soon as the top envelope in the stack causes its roller to move upwardly.

Figure 8:
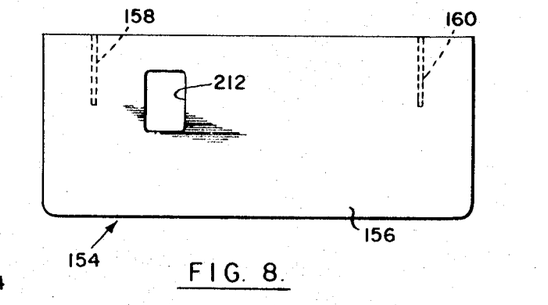
FIG. 8 is a top plan view of an elevator platform.
Figure 9:
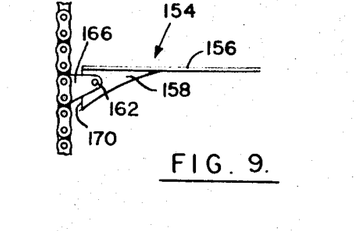
FIG. 9 is a side elevation of an elevator platform showing its connection to the driving chains.

The alignment of microswitch 208 with respect to the level of the lower edge of cut out portion 176 in plate 174 is somewhat critical in that the platform 154 must not be allowed to fold down when it has only one envelope on it, but must fold down as soon as that envelope is removed by the pick-up arm. An opening is provided in plate 156 at 212 (FIG. 8). This opening is aligned with roller 210 of the microswitch. As soon as the last envelope is removed from the plate, roller 210 drops through opening 212, reactivating the elevator drive motor. Brackets 158 and 160 immediately clear the lower edges of cut out portions 176 and 178 of plate 174 and the platform folds downwardly.

The platforms should be spaced along the platform drive chains 140 and 152 so that, while envelopes are being picked up from a stack resting on a platform, a new stack can be placed on the next lower platform. The platforms must be spaced sufficiently so that, when a platform folds down, it does not come into contact with a stack of envelopes of normal size on the next lower platform. There is no particular danger if too many envelopes are placed on a platform since the next higher platform, if it is not allowed to fold downwardly completely, will engage roller 210 of microswitch 208 causing the elevator mechanism to stop.

Figure 5:
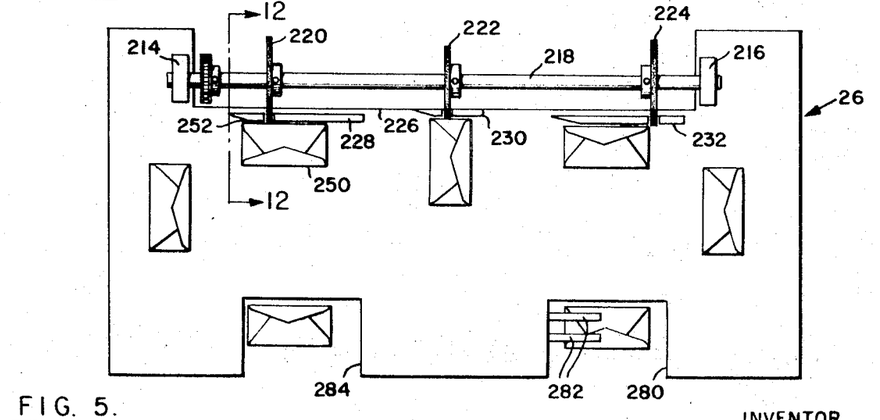
FIG. 5 is a top plan view of the deck located immediately below the deck shown in FIG. 4, showing the abrading wheels.

FIG. 5 shows deck 26, on which there is mounted a pair of bearings 214 and 216 supporting a shaft 218 on which there are mounted three abrasive wheels 220, 222, and 224. Abrasive wheel 222 is somewhat smaller in diameter than wheels 220 and 224.

Figure 4:
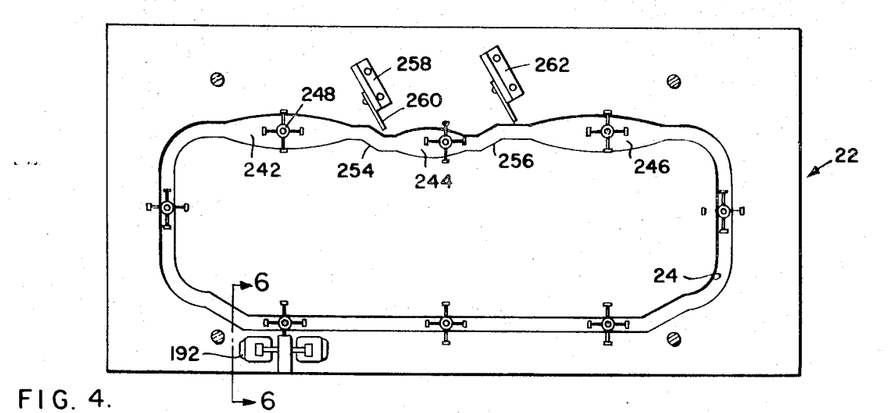
FIG. 4 is a top plan view of the deck located immediately below the cover plate, the figure showing the guide track for the envelope-carrying arms.
Figure 12:
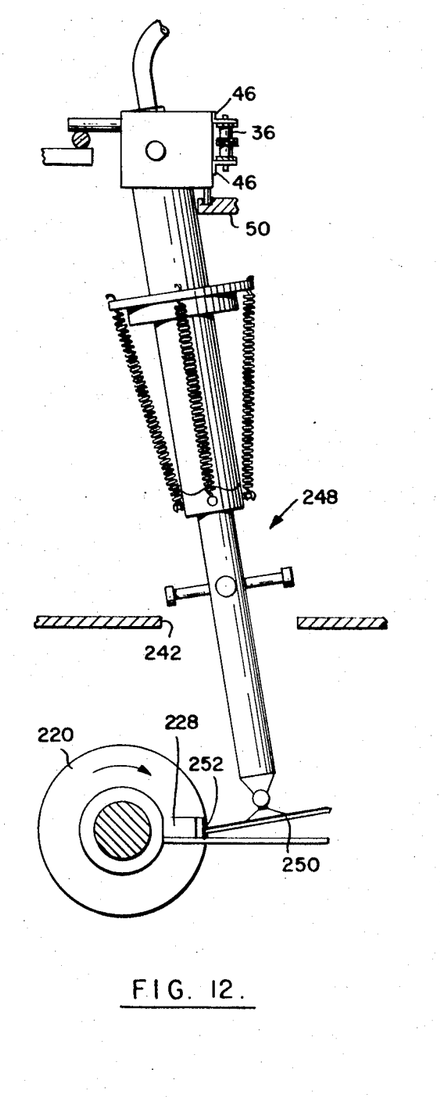
FIG. 12 is a vertical section taken on the plane 12—12 in FIG. 5.
Figure 13:
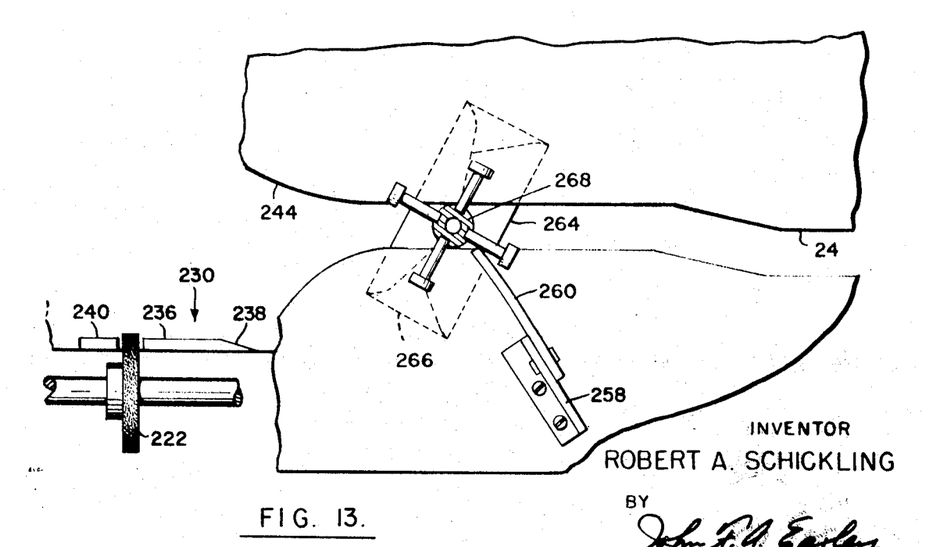
FIG. 13 is a plan view of an indexing mechanism for rotating an envelope 90° as it passes between abrading wheels.

Associated with each wheel and mounted on the recessed edge 226 of deck 26 are guides 228, 230 and 232. As shown in FIG. 13, guide 230 consists of a pair of elements, the leading element 236 having an oblique edge 238 for camming an approaching envelope inwardly with respect to the machine so that its edge rests against the inwardly facing surface of the guide. Trailing element 240 is spaced from element 236 to provide an opening for abrading wheel 222. The abrading wheel preferably extends about $\frac{1}{32}$ of an inch inwardly beyond the inwardly facing surfaces of the guide members. Guides 228 and 232 are similar. As shown in FIG. 4, on the rear side of the machine, slot 24 has three widened portions 242, 244 and 246. These widened portions permit the pick-up arms to swing about their pivots in order to accommodate envelopes of different sizes. As shown in FIG. 12, pick-up arm 248 is holding envelope 250, the bottom edge 252 of which is in contact with the inwardly facing surface of guide 228. The contact of the edge of the envelope with the guide is maintained by gravitational force acting on the pick-up arm, which is now oblique, its lower end being located farther toward the inside of the machine than its upper end. Arm 248 is not in contact with either edge of portions 242 of the guide slot. Its position is now determined by the size of the envelope. A larger envelope will merely cause the pick-up arm to be farther removed from the inwardly facing edge of portion 242 of the slot.

As an arm approaches one of the widened portions of the slot, it is released by the narrow portion, and swings outwardly until the envelope which it carries contacts the guide.

The rotating abrading wheel removes about 1/32 of an inch of paper from the edge of the envelope, and forms a dull edge as compared with that produced by a cutter. The dull edge cannot produce paper cuts which are practically unavoidable in handling envelopes opened by cutters.

Referring to FIG. 4, as a pick-up arm passes from widened portion 242 of slot 24 it is urged inwardly with respect to the machine by oblique portion 254, it then enters widened portion 244. It is then allowed to swing outwardly again by oblique portion 256 before it enters widened portion 246 of the guide slot. An L-shaped bracket 258 is mounted on deck 22. Bracket 258 supports a piece of flexible plastic, such as urethane 260, which is preferably arranged at an oblique angle with respect to the guide slot and in position to be engaged by the outwardly extending indexing pin of the approaching pick-up arm. A similar indexing mechanism 262 is provided along the porton of the guide slot connecting widened portions 244 and 246.

Referring to FIG. 13, it will be apparent that the indexing mechanism causes the plunger of the passing pick-up arm to be rotated. The knuckle joint prevents the plunger from rotating more than or less than 90°. The inherent resilience of the urethane element 260 causes the knuckle joint to snap into its stable condition as the arm passes the indexing mechanism. Edge 264 of the envelope has already been opened. Edge 266 is now presented for opening by abrading wheel 222. As the pick-up arm 268 enters the widened portion 244 of the guide slot 24, the pick-up arm is allowed to swing outwardly until edge 266 of the envelope comes into contact with the inwardly facing surface of guide member 230. 1/32 of an inch of paper is then removed from edge 266 by abrading wheel 222.

Returning to FIG. 4, as the pick-up arm approaches widened portion 246 of the guide slot, it is rotated another 90° by indexing mechanism 262 to present a third edge of the envelope to the next abrading wheel 224.

Abrading wheel 222 is made smaller than the other abrading wheels so that the passing pick-up arm does not have to swing inwardly too far when an exceptionally long envelope is being opened.

Figure 15:
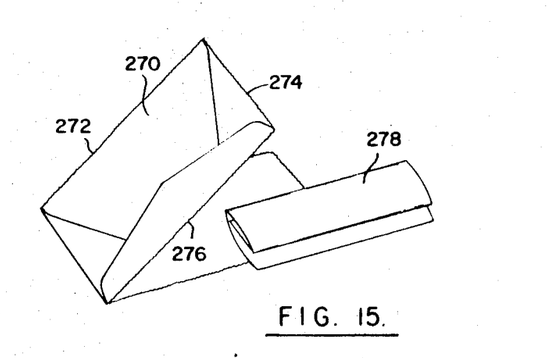
FIG. 15 is a perspective view of an envelope opened by the mail opening machine and its contents.

FIG. 15 shows an envelope 270 opened by the mail opener in accordance with the invention, edges 272, 274 and 276 having been opened by the separate abrading wheels. With three edges of the envelope opened, the contents 278 can be easily removed.

Referring to FIG. 5, the finished envelope is deposited in a chute 280, the vacuum being cut off at that point by the mechanism shown in FIG. 11. Arms 282 insure that the envelope drops into chute 280.

In the operation of the machine just described, a single operator can insert stacks of envelopes into the insertion point 284, and remove finished envelopes from chute 280. There is no particular critical time at which the stack of envelopes must be inserted; a new stack can be inserted while the previously inserted stack is being processed. The newly inserted stack is opened automatically without any further action on the part of the operator.

The envelopes are picked up by vacuum from the stack at the insertion point, and are carried individually past abrading wheels, the indexing mechanism effecting a 90° rotation of each envelope as they pass between adjacent abrading wheels. In this way, more than one side of an envelope is opened in an automatic operation.

The use of swinging arms permits the automatic accommodation of envelopes widely varying in size. There is no need for the operator to make adjustments for oddly shaped envelopes. He can insert a stack containing envelopes of various sizes, and they will be processed automatically.

I claim:

1. Apparatus for opening envelopes comprising carrying means, means for driving and guiding said carrying means along a path, means for securing an envelope to said carrying means, at least two means for opening an edge of an envelope located along said path, said opening means being spaced from one another, and means for effecting reorientation of said carrying means as it moves along the portion of said path between each adjacent pair of said opening means to present an unopened edge of the envelope being carried to the next opening means in said path.

2. Apparatus for opening envelopes according to claim 1 in which said means for securing an envelope to said carrying means comprises a pair of suction cups and means for producing a vacuum in said suction cups.

3. Apparatus for opening envelopes according to claim 1 in which said means for opening an edge of an envelope is a power-operated abrasive element.

4. Apparatus for opening envelopes according to claim 1 in which said means for opening an edge of an envelope comprises three abrasive wheels mounted on a common shaft and a motor for rotating said shaft.

5. Apparatus according to claim 4 in which said means for effecting reorientation of said carrying means comprises a first indexing means for causing rotation of an envelope through 90° as it passes between the first two of said three abrading wheels and a second indexing means for causing rotation of said envelope through an additional 90° as it passes between the second and third of said abrading wheels, said first and second indexing means being arranged so that the total rotation of said envelope is 180°.

6. Apparatus for opening envelopes according to claim 1 in which said carrying means comprises a plurality of arms and in which said path is closed.

7. Apparatus for opening envelopes according to claim 1 in which said carrying means comprises at least one arm, said arm comprising a first element fixed to said means for driving said carrying means along a path, a second element rotatable with respect to said first element and a plurality of pins extending outwardly from said second element, and in which said means for effecting reorientation of said carrying means includes fixed means for engaging one of said pins as the arm carrying said one of said pins passes said means to cause said second element to rotate with respect to said first element.

8. Apparatus for opening envelopes according to claim 7 in which each said arm is provided with detent means for holding its second element in one of a plurality of fixed relationships to its first element.

9. Apparatus for opening envelopes according to claim 7 in which said fixed means include a resilient flexible member for engaging the pins of said second element.

10. Apparatus for opening envelopes according to claim 1 in which said carrying means comprises at least one arm, said means for driving said carrying means along a path comprises a moveable mounting means and means pivoting said arm for swinging movement in said mounting means, said means for guiding said carrying means comprising means providing a slot for constraining said arm against swinging movement, said means for opening an edge of an envelope comprises at least two power-operated abrading means and guide means for preventing an envelope from moving farther than a predetermined distance into the path of said abrading means, said slot having a widened portion at the location of each of said abrading means to permit free swinging movement of said arm as it passes said abrading means.

11. Apparatus for opening envelopes of various sizes comprising a mounting, means for moving said mounting in a predetermined path, an arm, pivotting means supporting said arm in said mounting for swinging movement about said pivot, means on said arm spaced from said pivot for temporarily securing an envelope to said arm, power-operated abrading means having an operative point located in the path of an envelope carried by said arm and a guide means positioned to be engaged by said envelope for preventing the envelope being carried from moving more than a predetermined distance into the path of said abrading means.

12. Apparatus for opening envelopes according to claim 11 in which said predetermined path is a closed path, and including means defining a guide slot engaging said arm at a point in said arm spaced from said pivoting means to restrain said arm against swinging movement, being widened at the location of said abrading means to permit free swinging movement of said arm when the envelope carried by said arm is in position to be abraded.

13. Apparatus for opening envelopes comprising a plurality of arms, means for moving said arms in a closed path, suction means on each arm for securing envelopes to said arms, means for supporting a stack of envelopes to be opened underneath a point on the path of said suction means, means for moving said suction means downwardly against said stack when said suction means passes over said stack to pick up the top envelope therefrom, means located along said closed path for opening at least one of the edges of said envelopes, and means for releasing an envelope from said suction means at a release point along said closed path following said opening means and preceding said means for supporting a stack.

14. Apparatus according to claim 13 including means producing a vacuum and means connecting said means producing a vacuum to each of said suction means to produce the operative suction for securing envelopes to said arms, and in which said means for releasing an envelope from said suction means comprises means for cutting off the connection between said means producing a vacuum and an individual suction means when the envelope carried by said individual suction means is at said release point.

15. Apparatus for opening envelopes comprising means for picking up and carrying envelopes in a path, means disposed along said path for opening said envelopes, and an elevator for supporting a stack of envelopes at a pick-up point so that the topmost envelope in said stack is always located in close proximity to a particular position, said elevator comprising at least one platform for supporting said stack of envelopes, a motor connected to raise said platform and a switch positioned to be actuated by the topmost envelope in said stack when said topmost envelope is in close proximity to said particular position, said switch being connected to stop the operation of said motor when actuated.

16. Apparatus according to claim 15 in which said switch is provided with a vertically movable actuating element, said switch being connected to stop the operation of said motor when said element is moved upwardly, and said elevator comprising a plurality of platforms, a continuous chain drive means driven by said motor, means for pivoting said platform on said chain drive means, means for maintaining said platform substantially horizontal throughout a portion of their path of travel immediately preceding said particular position, means permitting said platform to fold down when they pass said particular position, each said platform being provided with an opening positioned so that said vertically movable actuating element can move downwardly through said opening when the last envelope is picked up from said platform in order to reactivate said motor to move said platform past said particular position.

References Cited

UNITED STATES PATENTS

| | | | |
|---|---|---|---|
| 965,868 | 8/1910 | Byrnes | 83—912 X |
| 2,992,629 | 7/1961 | Belopavlovich | 53—381 X |
| 3,116,718 | 1/1964 | Krupotich et al. | 53—381 |
| 3,238,926 | 3/1966 | Huck | 53—381 |

LESTER M. SWINGLE, Primary Examiner

U.S. Cl. X.R.

53—381 R; 83—912